Feb. 11, 1930. E. S. DAVIS 1,746,821
STEAM HOSE AND METHOD OF MAKING THE SAME
Filed Nov. 20, 1925
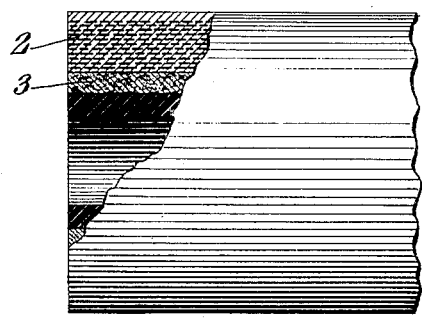
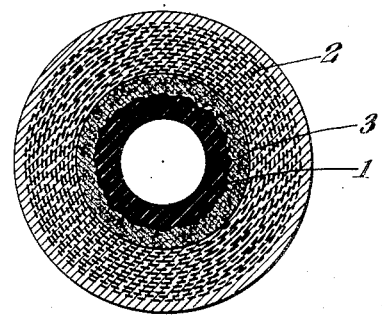
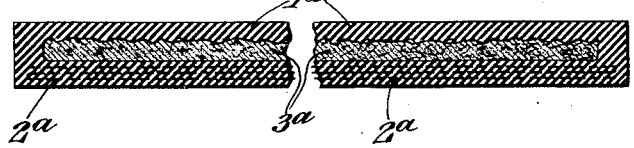
INVENTOR.
Edwin S. Davis
BY
Prindle, Wright Neal & Bean ATTORNEYS.

Patented Feb. 11, 1930

1,746,821

UNITED STATES PATENT OFFICE

EDWIN S. DAVIS, OF NEW YORK, N. Y.

STEAM HOSE AND METHOD OF MAKING THE SAME

Application filed November 20, 1925. Serial No. 70,238.

The invention aims to provide a steam hose or analogous laminated article subjected to heat in use wherein the fabric reinforcement usually employed as one element thereof will be adequately protected against the continuous heat which tends to dry out the reinforcement and impair its strength.

The invention also aims to overcome the tendency of the layers of steam hose to separate or cleave from each other during use.

Further objects and advantages of the invention will be in part obvious and in part specifically pointed out in the description hereinafter contained which, taken in conjunction with the accompanying drawings, discloses certain preferred embodiments thereof, together with a process of manufacture suitable therefor; such disclosure, however, is to be considered as merely illustrative of the principles of the invention. In the drawings—

Fig. 1 is a side view, partly cut away, of a steam hose constructed in accordance with the invention.

Fig. 2 is a cross sectional view of the hose appearing in Fig. 1.

Fig. 3 is a cross sectional view illustrating the invention as applied to a laminated article of manufacture suitable for use as a heat resistant belting.

The invention relates primarily to laminated articles such as steam hose or belting, wherein one surface is exposed to the continuous action of heat, and a fabric reinforcement is provided to impart mechanical strength thereto. The heat tends to dry out the fabric reinforcement and progressively weaken it and also, particularly in the case of steam hose, the fabric reinforcement which is relatively non-elastic tends to separate from the fluid conducting tube of the hose after continued use. In accordance with the present invention, as illstrated in Figs. 1 and 2, I interpose between the rubber tube 1 of the hose and the fabric reinforcement 2 thereof, a layer 3 of porous material which contains air within its pores and thereby consitutes an efficient medium for protecting the reinforcement 2 against the heat of the steam passing through tube 1. The layer 3 also is preferably elastic whereby the expansion and contraction of the tube 1 in service will not cause it to separate from the reinforcement 2. I prefer to make the layer 3 of sponge rubber which is a convenient material possessing the qualities above stated to be desirable.

In the manufacture of the hose the rubber tube 1 may be formed in the usual manner and the layer 3, consisting of rubber with suitable sponge producing ingredients, such as ammonia salts or other known compounds, superimposed thereon. The fabric reinforcement 2 of frictioned duck or other suitable material is then placed upon the layer 3 and the hose thus formed is subjected to the usual vulcanizing process. During vulcanization the sponge producing ingredients will cause the layer 3 to swell and form its gas-containing pores. To afford room for the expansion I prefer to provide a roughened or irregular outer surface upon the tube 1 whereby the rubber of layer 3 may swell into the depressions in the surface of tube 1 during vulcanization.

As above stated, the sponge rubber thus produced in layer 3, will protect reinforcement 2 from the heat of the steam passing through tube 1, and the elasticity of layer 3 will permit tube 1 to expand and contract under changes in pressure, without separating from reinforcement 3.

In Fig. 3, the invention is illustrated as applied to a heat resistant belting having an outer rubber layer 1$^a$, backed by a fabric reinforcement 2$^a$ of frictioned duck or the like. A layer 3$^a$ of sponge rubber is interposed between layers 1$^a$ and 2$^a$, the process of manufacture being in general similar to that described in connection with Figs. 1 and 2; that is to say, rubber containing sponge forming ingredients is deposited on one side of the layer 1$^a$, the reinforcement 2$^a$ is placed in position and the belt thus formed is vulcanized under pressure to form the sponge in layer 3$^a$. In this instance the inner surface of layer 1$^a$ is also preferably rough or irregular to enable the layer 3$^a$ to swell into the depressions during vulcanization.

A belting of the above character is particularly adapted for conveying hot articles, in that the layer 3 will protect the reinforcement $2^a$ from the heat.

While certain specific embodiments of the invention have been described, it will be obvious that many changes may be made therein without departing from its principles as set forth in the following claims.

I claim:

1. A hose comprising an inner tube, a fabric reinforcement surrounding the same and a layer of sponge rubber interposed between said tube and reinforcement, said tube, reinforcement and layer being permanently united.

2. A hose comprising an inner tube, a fabric reinforcement surrounding the same and a layer of sponge rubber interposed between said tube and reinforcement, one of the parts of the hose engaging said sponge rubber layer having an irregular surface, said tube, reinforcement and layer being permanently united.

3. The method of making hose which comprises building up upon the inner tube a layer of rubber containing sponge forming ingredients, enveloping said last mentioned layer with a fabric reinforcement and vulcanizing the hose thus formed, to join together permanently the tube, layer and reinforcement.

In testimony that I claim the foregoing, I have hereunto set my hand this 6th day of November, 1925.

EDWIN S. DAVIS.